(12) United States Patent
Sun (10) Patent No.: US 7,341,608 B2
(45) Date of Patent: Mar. 11, 2008

(54) METHOD FOR MAKING A DEVICE OF STORING ENERGY, ENHANCING THE EFFICIENCY OF MANUFACTURE AND THE RELIABILITY OF PRODUCTS

(76) Inventor: Ming Hsin Sun, 5F., No. 16, Lane12, Shihjie St., Jhudong Township, Hsinchu County 310 (TW)

( * ) Notice: Subject to any disclaimer, the term of this patent is extended or adjusted under 35 U.S.C. 154(b) by 438 days.

(21) Appl. No.: 11/003,987

(22) Filed: Dec. 2, 2004

(65) Prior Publication Data
US 2005/0262675 A1 Dec. 1, 2005

(30) Foreign Application Priority Data
May 28, 2004 (TW) .................................. 093115405

(51) Int. Cl.
*H01G 9/00* (2006.01)
(52) U.S. Cl. ............... 29/25.03; 438/800; 257/E21.008
(58) Field of Classification Search ...................... None
See application file for complete search history.

(56) References Cited

U.S. PATENT DOCUMENTS 6,174,337 B1 * 1/2001 Keenan ..................... 29/25.03

* cited by examiner

*Primary Examiner*—Michael Lebentritt
*Assistant Examiner*—Kyoung Lee (57) ABSTRACT

This invention demonstrates a method for making a device of storing energy, enhancing the efficiency of manufacture and the reliability of products. The electrode plates of storing energy are accumulated according to the working voltage needed to form a pre-structuring unit of storing energy. The electrolyte leak of a capacitor and the unequal voltage of an accumulative unit, which are the main factors of the fail in a conventional capacitor, are solved by using three layers of sealing gel. And then, the electrolyte is to back fill in by vacuum and to seal the units to accomplish the device of storing energy. Each porous electrode in the device has two faces at the same time, which are used for the positive and negative poles respectively. The electrode plates are assembled with bipolar structure, the same as the series connection of the storing-energy devices, which can reduce the volume and mass of the device and the cost of the manufacture. Such kind of energy-storing units can be adjusted according to the need of customers in layers of units or sizes of the area of the electrodes, which are of great advantage to mass production.

21 Claims, 8 Drawing Sheets

METHOD FOR MAKING A DEVICE OF STORING ENERGY, ENHANCING THE EFFICIENCY OF MANUFACTURE AND THE RELIABILITY OF PRODUCTS

BACKGROUND OF THE INVENTION

1. Field of the Invention

The invention presents to a novel method to produce an excellent storing energy device, enhancing the efficiency of manufacture and the reliability of products particularly for the bipolar ultracapacitors. Two main problems to the bipolar assembling devices are the electrolyte leak of the sealed device and the unequal voltage among the accumulating cell units. The invention can thoroughly solve the problems as well as limitation of mass production and constitute a highly reliable and efficient element of storing energy.

2. Description of Related Art

Among devices of storing energy, the two representative components are batteries (such as lithium cell and Ni—H cell) and capacitors (such as aluminum electrolytic capacitor, ceramic capacitor or tantalum capacitor). Batteries are typically low power devices whereas conventional capacitors may have a power density of 106 watts per dm3 at a very low energy density. Ultracapacitors are devices with energy storage density and power density intermediate between capacitors and batteries. Thus, ultracapacitors may improve battery performance in terms of power density or may improve capacitor performance in terms of energy density when combined with the respective device. In addition, ultracapacitors are expected to have a much longer cycle life than batteries because none or negligibly small chemical charge transfer reactions are involved.

Ultracapacitors may be classified into two groups, namely, electric double-layer capacitors (EDLC) and pseudo-capacitors. The former stores electric charges at the double-layer formed at electrode electrolyte interface. Electric charges of the latter are stored mainly in the electrode surface region by faradaic reactions, with energy density 5-10 times of the electric double layer.

In general, there are three kinds of material of electrodes applied in ultracapacitors: carbonaceous material, metal oxide and conductive polymer. The main electrode materials of carbonaceous ultracapacitors, the representative of double layer, are active carbon, glass carbon or active carbon fiber cloth. The mechanism of storing energy is made of the isolated electric charge on the interface between electrode and electrolyte of electric double layer. As for pseudocapacitance, there are two kinds of material of electrode: the metal oxide (such as, $RuO_2$, $IrO_2$, $Co_3O_4$, $MoO_3$, $WO_3$ and molybdenum nitride) and conductive polymer (such as, polyaniline, polypyrrole and polythiophene.) There are three methods for constructing an ultracapacitor. The first one is wind type, utilized by many carbonaceous ultracapacitors. The advantage for winding ultracapacitors is that the electrode area is enormous whereas the connection between units of ultracapacitors, the volumetric density with high voltage ultracapacitors and connection between electrodes are disappointing. The second method is stacked type. The advantage is that the units are easily constituted to series connection and stacking density of the piles is high. The third one is bipolar stacked type, using the oppositely two sides of electrode for the positive and negative poles. It obtains easily high voltage and is organized efficiently and its volume is easily reduced, which can reduce the manufacturing cost. However, this method requires the isolation of electrolyte between the units and is thus more difficult.

The key problems of encapsulation are the electrolyte leak and the unequal voltage of accumulative units. The technical level for mass production is much higher than the wind and stacked types. For the details, refer to the patents of U.S. and of TW: U.S. Ser. Nos. 06/005,764, 05/867,363, 05/384,685, 05/464,453 05/980,977, 06/174,337, 05/800,857, 05/821,033, 05/711,988, TW 283273 and TW284921.

Figure 1:
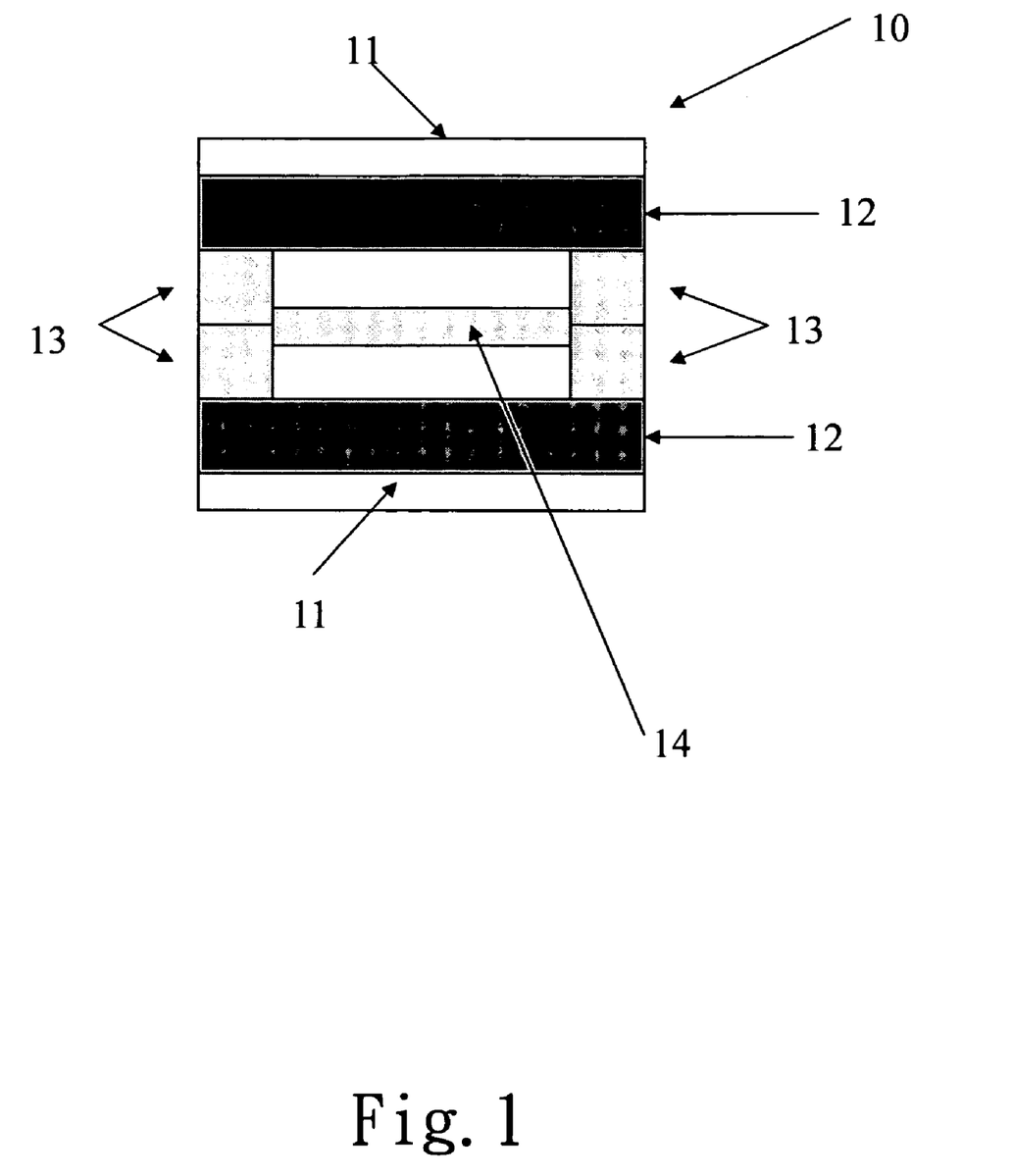
FIG. 1 illustrates the unit of ultracapacitor.

As shown in FIG. 1, the unit cell of the ultracapacitor (10) comprises two electrically conducting flat sheet (11) coated on a high surface area material as the electrode (12), ion permeable or semipermeable separator (14), immersed by electrolyte, and then packaged by encapsulant (13). The electrolyte may be aqueous or organic. The aqueous solution offers low internal resistance but limits the voltage to 1 volt. In contrast, the organic electrolyte allows 2.5~3V volts of charge, but the internal resistance is higher.

The working voltage and capacitance of the unit can be enhanced by series and parallel connections. To operate at higher voltages, ultracapacitors are connected in series. On a string of more than three capacitors, voltage balancing is required to prevent any cell from reaching over-voltage. Numberless ultracapacitors can be in series connected by circuit. However, for ultracapacitors with high voltage, the circuit system needed is huge. Furthermore, in order to ensure the reliability of the whole ultracapacitor, the balanced circuit must be added between the individual units. These make ultracapacitors disadvantageous in the respects of volume, weight, cost and manufacture.

Figure 2:
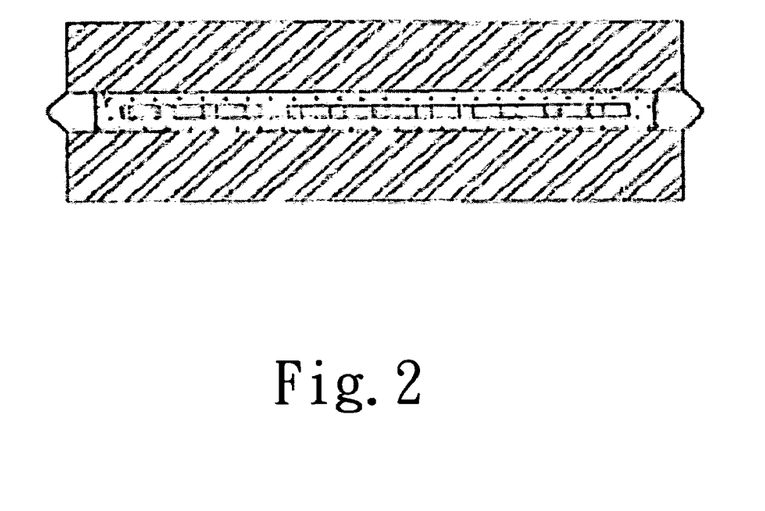
FIG. 2 illustrates the unit of storing electricity.
Figure 3:
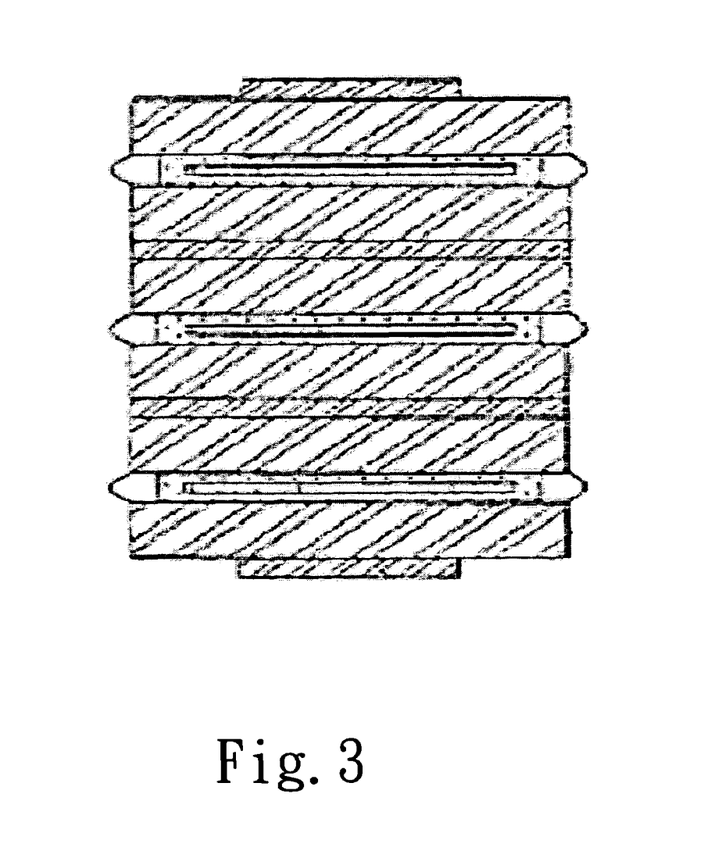
FIG. 3 illustrates the units accumulated.

Among other methods to enhance the working voltage of ultracapacitors, the adherence is more efficient, which in series connects ultracapacitor units by the adherence of silver or conductive gels. For a detailed description of this, refer to TW. Patent 472271. The electrolyte is filled in a proper interspace between the two electrodes to form a single unit. Then a few units made in the same way are adhered and accumulated to each other. FIG. 2 shows the storage energy unit. FIG. 3 shows the accumulation of units. Each of them is adhered by silver or conductive gels, similar to the series connection of unit. Finally, the accumulation of units is packaged by a container to form an ultracapacitor with high voltage and the material of the top and bottom of the container is elastic and conductive. Although this method is better than the circuit of series connection, the silver or conductive gels will decay in the process of charge and discharge, which decreases the reliability of the ultracapacitor. Besides, the efficiency of the electrode plates is far worse than that of the structure of bipolarity.

The structure of bipolarity is the most efficient for series connection. The method uses the oppositely two sides of each electrode plate for the positive and negative poles at the same time. Every unit can be closely in series connected to each other. The usage of electrode plates is around half of the adherent series connection. For example, the adherent series connection with 100 V needs 200 pieces of unitary electrode plate with 1 V. However, the bipolar one only needs 101 pieces of that. The characters of bipolar series connection are that the physical and electrical properties of each unit are equal and that the electrolyte of each unit is isolated.

Figure 4:
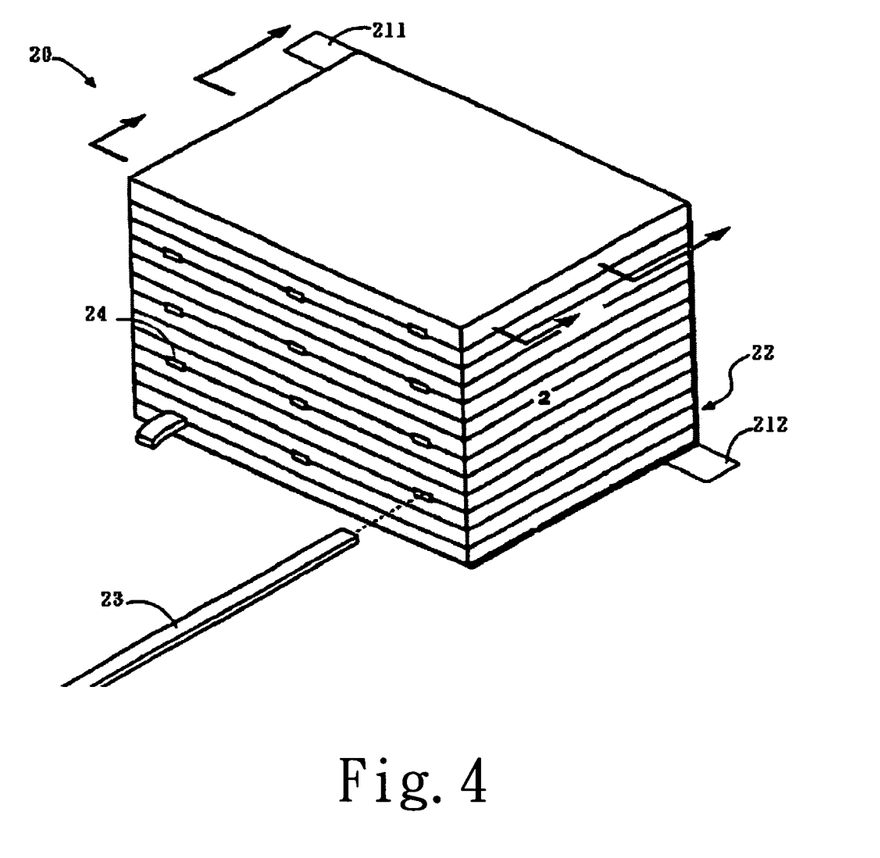
FIG. 4 illustrates the conventional bipolar structure of an ultracapacitor.

The one shown in FIG. 4 is a conventional bipolar ultracapacitor structure 20. (For a detailed description, see U.S. and TW. Patents: U.S. Ser. Nos. 06/005,764, 05/867,363, 05/384,685, 05/464,453, 05/980,977, 06/174,337, 05/821,033, 05/711,988, TW 283273 and TW284921.) The ultra capacitor has an upper conductive plate 211 and a lower conductive plate 212 on the top and the bottom for connecting outside electricity. The proper amount of electrodes 22 is directly to be accumulated to a dry pre-structuring unit. A cord 23 is used to make a beforehand port 24 of the dry prepared unit. There is a gasket between each electrode and then the fillport is filled with the electrolyte. Finally, the structure 20 of ultracapacitor is finished.

However, there are serious defects in the packing method mentioned above in the efficiency of manufacture and the reliability of products. In the respect of reliability, to begin with, the connection of pores by three-dimension electrode causes the electrolyte leak. Second, the different distance of each electrode causes different height of each stored energy unit. An expansion or crack of the stored energy units may occur, as the units can't equally share the voltage when the ultracapacitor charges or discharges. The mass production may be inefficiency due to setup of the gasket, placement and extraction of the cord, the beforehand port and the adhesive binding.

Figure 5:
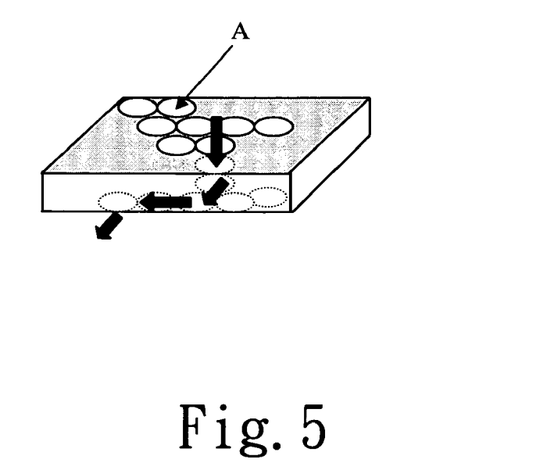
FIG. 5 illustrates the porous electrode.

The high capacitance of ultra capacitors mainly comes from the high surface area of the electrode. As shown in FIG. 5, the electrode pores can be alone or connected to each other by 2D or 3D structures. According to the size, the holes can be divided into micropores smaller than 10 μm, macropores bigger than 50 μm and mesopores between these two. The micropores are unavailable for the ultracapacitor mechanism of storing energy, whereas the mesopores are the most suitable ones. The electrolyte leak is due to the connection between each electrode pore by 3D. As illustrated in FIG. 5, the surface pore A of the electrode is easily blocked by the sealing gel but the edge and side pores of the electrode are difficult to block. Even though the electrode is spread around with the gel in order to allow the low viscosity gel to penetrate into the pores, as in the TW. Patent 472271, this method still can't prevent the leak of the sealed side. It is because that not all the pores vertically connect through the electrode. In the layer of electrode, some pores don't connect to the surface of the electrode but connect to the edge and side of the electrode. The electrolyte is leaked from these pore channels.

Besides, every unit has to share the same voltage under the operation of high working voltage. When the individually shared voltage exceeds what the unit can support, the capacitor begins to expand, leak and then crack. In order to let the units of ultracapacitor equally share the voltage, the structure of every unit must be same. The distance between every electrode is a very important parameter and is controlled by the gel-sealed wall or the gasket between the electrode. In TW. Patent 472271, the gel-sealed wall is used. The gel spread on the electrodes with pores and screen printing are used for the isolation of the electrode to control the height of the ultra capacitor units. As the gel-sealed wall is on the electrode pores with different depth, its thickness is hard to control. This results in different height of each unit and further influences the height of the multiple units. For example, if the difference in height for one unit is 10 μm, the difference for the ultra capacitor with 100 V will be 1 mm, which will cause serious influence on the average voltage of the ultracapacitor with high working voltage. In U.S. and TW. Patents: U.S. Ser. Nos. 06/005,764, 05/867,363, 05/384,685, 05/464,453, 05/980,977, 06/174,337 05/800, 857, 05/821,033, 05/711,988, TW 283273 and TW284921, the unitary he is controlled by the gasket. This method also first lets the low viscosity gel penetrate into the electrode pores and then control the unitary height by using the gasket. However, the gasket loses its accuracy for the same reason— The thickness of the pores is hard to control due to the gel sealing. This makes the height of each unit different and further influences the distance between the units.

SUMMARY OF THE INVENTION

Problems to Solve:

The invention particularly designs and develops a method for making a device of storing energy, enhancing the efficiency of manufacture and the reliability of products. For the pre-structuring units of storing energy formed by accumulating electrodes according to working voltage needed, the problems of the leak of capacitors and the unequal voltage of accumulative units are solved by sealing with three layers of gel and then the unit is sealed to accomplish the device of storing energy after filled with the electrolyte. The invention makes the manufacture of ultracapacitors easier and more efficient and also produces benefits by reducing the cost.

Accordingly, the invention aims to provide a device of storing energy, enhancing the efficiency of manufacturing and the reliability of products, which is beneficial to mass production. In addition, it also solves the problem of the reliability resulting from the leak of a capacitor and of the efficiency of industrial mass production, enhances the ratio of good quality of products, prolongs the operating life of elements of storing energy and reduces the cost of production.

As the manufacturing procedure indicated by the invention, according to the need of capacitance and voltage, the electrodes and the isolating separators are accumulated to form the pre-structuring unit of storing energy, then the electrolyte is filled and then the filled pores are sealed to accomplish the production of an ultracapacitor.

Improvements of the Previous Devices

The structuring method of the invention includes the following steps:

A. Production of the Pre-Structuring Unit of Storing Energy:

(1) Circumferential Disposal of the Electrode Plate:
To scrape the circumference of the double-faced electrode plate to form the electrodes with an arc angle.

(2) Coating of the First Gel Wall:
Surrounding the multipore electrodes, to coat the electrode plate with the gel to form a looped wall with an arc angle.

(3) Coating of the Second Gel Wall:
On the area immediately adjacent to periphery of the first gel wall, to coat the matrix with the gel to form another gel wall that is higher than the first one.

(4) Cutting of the Electrodes:
To cut the electrode plate according to the size needed and to perforate the pre-prepared matrix without multipore electrodes.

(5) Accumulation of the Pre-Structuring Units:
According to the pre-prepared pores of the electrode plate, to place the isolating separators in between the electrodes to accumulate the pre-structuring units.

(6) Coating of the Third Gel Wall:
Under pressuring the pre-structuring units, to coat the side area to form the third gel wall.

(7) Melting of the Get Walls:
To heat to melt the first, second and third gel walls and to seal off the pre-structuring units of storing energy except the pre-prepared pores. And then to release the pressure to accomplish manufacturing of the pre-structuring units of storing energy.

B. Filling of the Electrolyte:
Through the filled pores, to fill the electrolyte into the pre-structuring units of storing energy.

C. Sealing of the Filled Pores of the Pre-Structuring Units:
To seal the pores with the gel and to pour in the insulated resin.

Ultracapacitors of metal oxide can immediately function with high power. Its electrode is coated or attached to the metal conductor support. The metal support as the current collected is selected from titanium, tantalum, niobium, zirconium, iron, copper, lead, tin, nickel, zinc or their mixture. The thickness of the coated metal oxide is around 0.1~200 μm. The coated metal oxide is selected from tin, lead, vanadium, titanium, ruthenium, rhodium, tantalum, osmium, iridium, iron, cobalt, nickel, copper, molybdenum, niobium, chromium, magnesium, lanthanum, lanthanide, alloy or their mixed metal oxide. In addition, some percentage of additives can be added to increase the conductivity.

There are three coating methods of the metal oxide on the metal support: (1) solution method (including sol-gel) (2) electrochemistry deposition (3) physical and chemical vapor deposition. Among them, the solution method is the most common one. It can be further divided into: 1. dip coating 2. spray coating 3. roll coating 4. spin coating 5. doctor blading.

The gel walls consist of the insulated polymer gel, which has good adhesion to the electrode plate and can endure the acid and base. For example, the thermal plastic polymer can be heated to melt and then be cooled to cure.

The first gel wall is the polymer gel with low viscosity. It can penetrate the multipore electrodes of metal oxide and get into the pores of the electrodes surface. The coating area is around 10% of the electrode area. The first gel wall can be made by the dip coating. It can also be made by using a gel dispenser to dispense the gel or by a screen printer to print. The material of the second gel wall is the same as the first one. It can be made by dispensing the gel on the flattened support or by screen printing on the wall or by using the gasket of the same material to build a wall 10~100 μm higher than the first one. The gel wall can fix and control the distance between the electrode plates, which has considerable influence on the average voltage of the units. Besides, if the gel wall is too thin, a large leakage may occur.

A stack is created by staring with a endplate and alternating electrode separator until the desired number of cells is created ending with a second endplate.

The separator between the electrodes is a thin and porous film such as glass fibers or polymer films (PE, PP, PTFE). The shape and width of the separator are the same as those of the electrode plates without the coated gel walls yet The third gel wall with 10~100 μm thickness is casting to prevent the leak of the sealed side of the adjacent electrode in the stack.

The stack is treated under pressure to cause reflow of the three gel walls, adhering and sealing the perimeter of the electrode materials to the adjacent electrode in the stack; thereby, creating isolated cells and an assembled stack unit. These treatments include for example: hot wind, infrared rays, ultrasound waves or high frequency waves.

The electrolyte, including aqueous electrolyte (H2SO4 or NaOH solution) or organic solution, is filled into the fillport of the pre-structuring units of storing energy by vacuum.

To seal the fillports of the pre-structuring units, the gel, the material of which can be the same as the gel walls, can be used to spray with by using a glue gun or a brush or be poured into the pores. Then the insulating polymer resin (for example epoxy or acrylic resin) is poured into to form the unitary shape.

DETAILED DESCRIPTION OF PREFERRED EMBODIMENT

Figure 6:
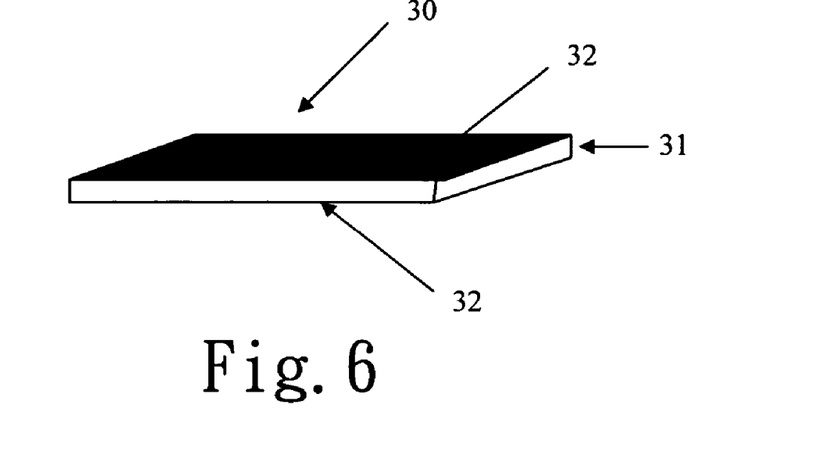
FIG. 6 illustrates the electrode plate of an ultracapacitor in the invention.

Referring to FIG. 6 to 14, a description for the novel method to produce the pre-structuring unit of an ultracapacitor 70 is as follows:

As shown in FIG. 6, the electrode plate 30 is provided and electrode 32, which is the high surface area electrically conducting coating materials, is applied onto the support material 31. The support material surface is rough. This smooth surface sometimes causes inadequate adhesion of the porous coating. The thickness of the electrode 32 is about 1~10 μm with non-uniform pores on the surface.

Figure 7:
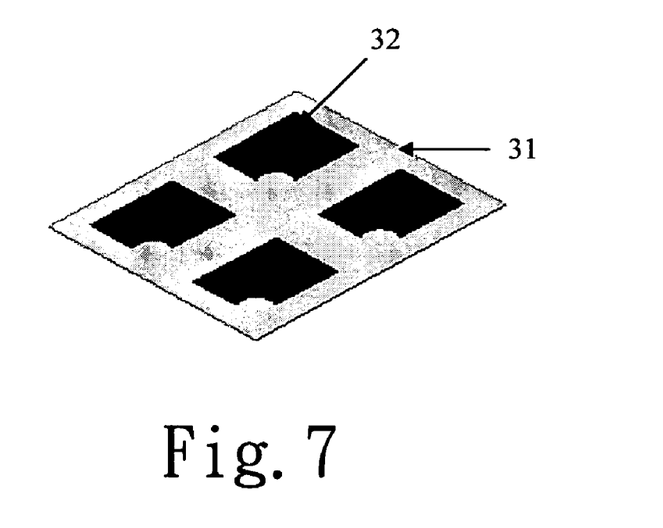
FIG. 7 illustrates the scraped form of an ultracapacitive electrode in the invention.

Next, both sides of the electrode plate 30 fully coated with electrodes 32 are scraped to form the square electrodes 32 with an arc angle. It can also be any shapes and the level support material 31 (ex. Ti metal) is exposed.

Figure 8:
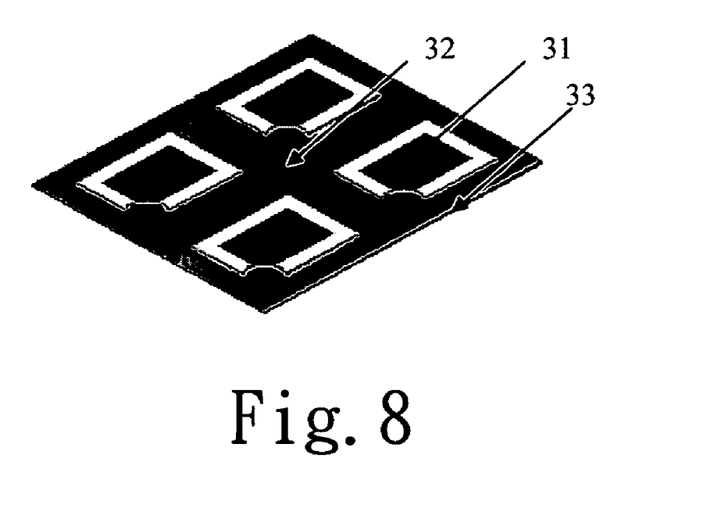
FIG. 8 illustrates the coating of the first gel wall of an ultracapacitor in the invention.

And then, as shown in FIG. 8, the first gel wall 33 that blocks the electrode pores is made by using the 1~10% low-viscosity gel, such as, the Kraton gel in toluene/acetone solvent, to coat along the edge of the electrodes 32 to penetrate through the electrode 32 pores. Its thickness is slightly higher than the height of the electrode 32 by 10~90 μm and its width is between 0.1~2 mm. As the depths of the pores on the edge of the electrodes 32 are different, the thickness is difficult to control. For this reason, the purpose of the first gel wall 33 is not to control the distance between the electrode plates but block the pores on the edge of the electrodes 32 in order to prevent from electrolyte leaking of the device.

Figure 9:
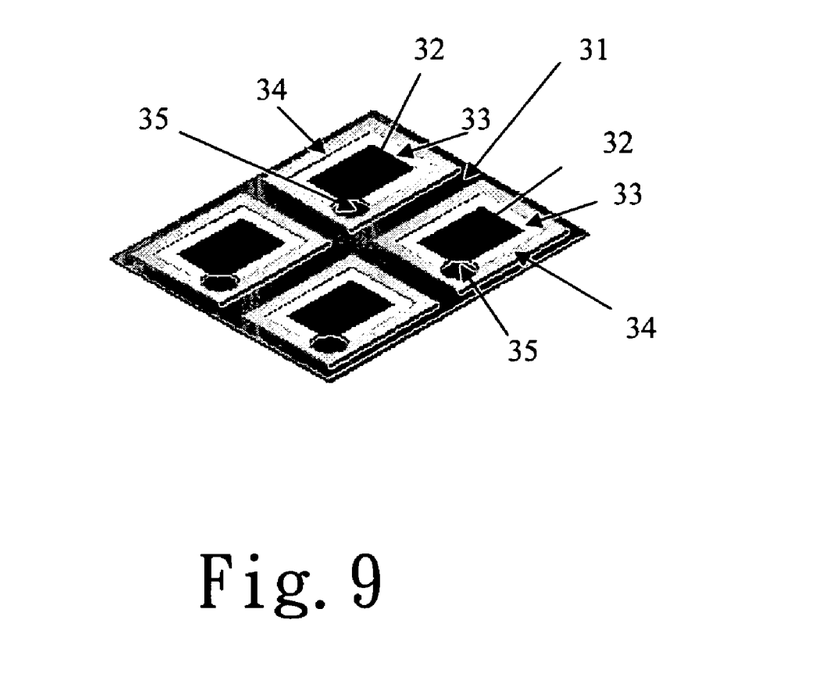
FIG. 9 illustrates the coating of the second gel wall of an ultracapacitor in the invention.

The second gel wall 34 is coated on the flat surface of the support material adjacent to the first gel wall 33. The width of gel wall is between 0.1~2 mm and height is around 50~100 μm. And the height of the second gel wall 34 is measured by flatness measuring instrument which assists in controlling the heights of the gel wall. The error of the distance is preferably below 5%.

The equally shared voltage for the unit cells of an ultracapacitor depends on the same thickness of the second gel wall 34.

Figure 10:
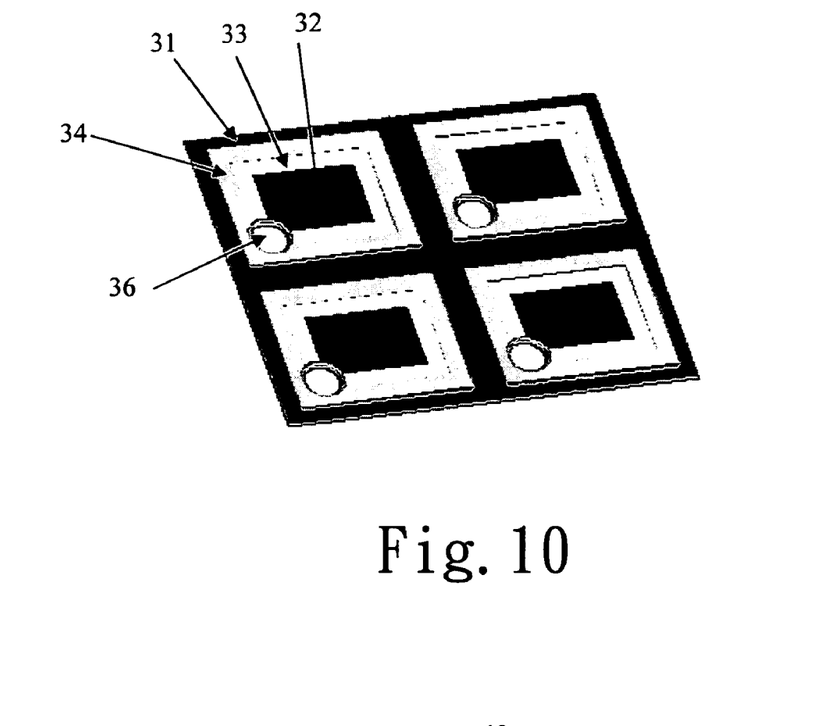
FIG. 10 illustrates the cut form of ultracapacitive electrode plate in the invention.

As shown in FIG. 9, there is one or more circular region of the support material 35 left on the bottom of the electrodes. According to the need of the custom, the electrode plate is cut. As shown in FIG. 10, the large electrode plate is cut into small ones and then one hole is made in the circular region of the matrix left previously on the electrode, used as the pre-prepared pore 36, the area of which is smaller than the circular region. Methods of the cutting include wire cutting, press cutting and laser cutting.

Figure 11:
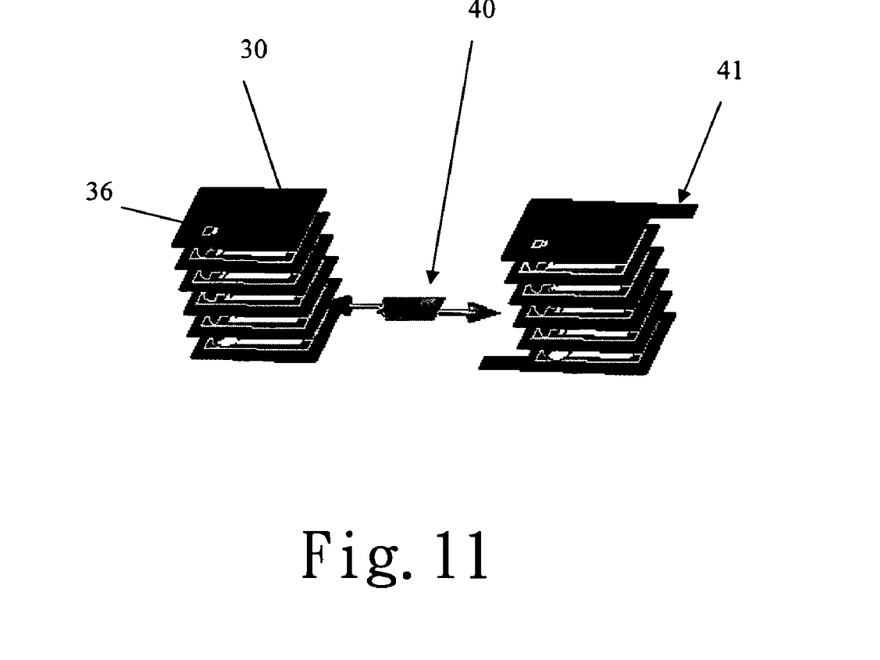
FIG. 11 illustrates the accumulated ultracapacitive electrode plates in the invention.

Next, according to the working voltage required, the electrode plates 30 are assembled. As shown in FIG. 11, one separator 40 with the same shape as the electrode plates 30 is placed between the electrode plates. In the top and bottom, there are extended electrode plates (endplates) 41 or a welding connector to link with the outer electricity. A stack is created by staring with a endplate and alternating electrode separator until the desired number of cells is created ending with a second endplate. The gap between the electrode plates is controlled by the second gel wall 34.

The thickness of the separator 40 is smaller than the height of two of the second gel walls 34 between the electrode plates. The materials used for the separators include glass fibers, PE, PP, PTFE. The shape and size of separators are the same as those of the electrode plates without the coated the gel walls. The separator which can be penetrated by the electrolyte, is porous and acid (or base) resistant with 15~150 μm thickness. If it is too thin, it will cause most of the electron to conduct electricity. Conversely, if it is too thick, it will increase the ESR of the capacitor.

Figure 12:
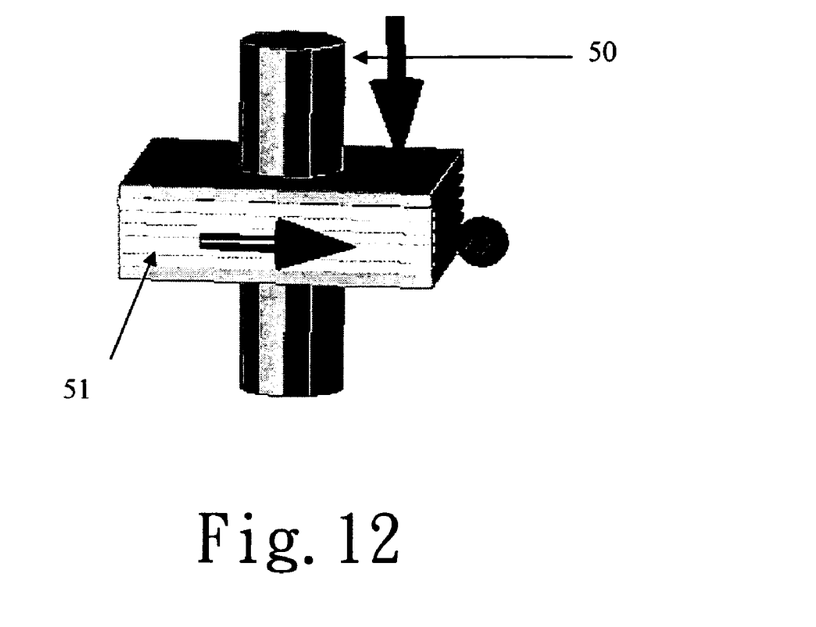
FIG. 12 illustrates the pressured and accumulated form of ultracapacitive electrode plates and the coating of the second gel wall of an ultracapacitor in the invention.

And then, as shown in FIG. 12, the accumulated electrode plates with gel wall under pressure are stacked by the pressing stacking device 50. The distance between the electrode plates is pressed to be the smallest one. And then the third gel wall 51 is built by coating. After that, the first, second and third gel walls are heated to melt into a whole to make the sealing more closely. The gel walls can be melted by hot wind, infrared rays, ultrasound waves or high frequency waves. Next, release the pressure to accomplish the production of the pre-structuring unit 60 of storing energy.

Figure 13:
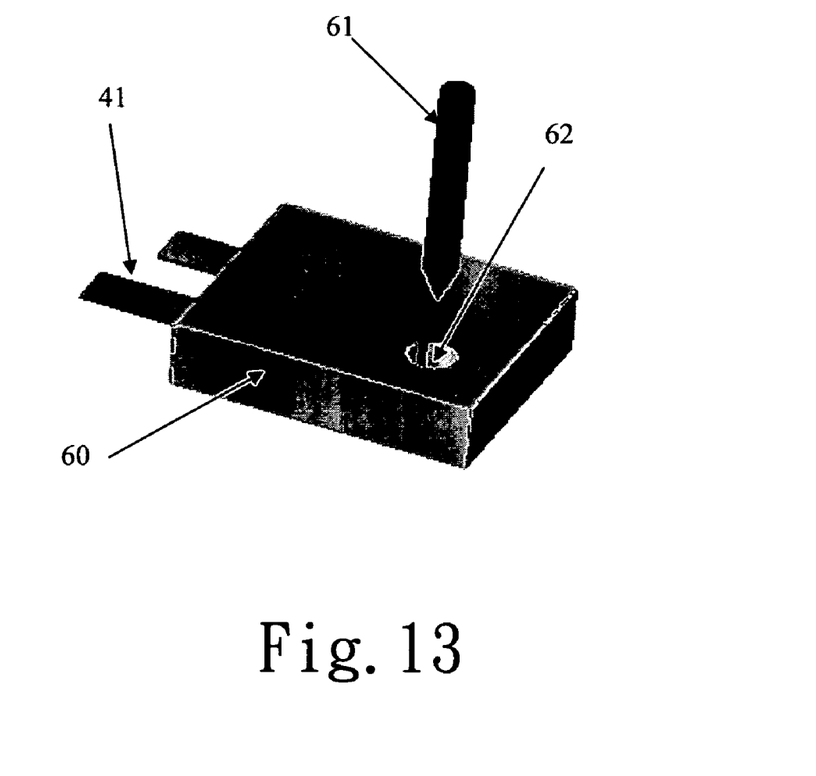
FIG. 13 illustrates the sealing of the fillports of the pre-structuring unit in the invention.

The electrolyte is poured in by vacuum to back fill the pre-structuring unit 60 of storing energy. As shown in FIG. 13, the filled pore 62 is the only one channel to outside. Along the edge of the filled-pore 62 is coated with the gel by using a brush 61. As the region touched by the brush 61 are the flat surface of the support material and the edge of the porous electrodes, the method is comparatively guarantee of the sealing. Finally, the filled-pore 62 is fully filled by pouring in the sealing gel or other insulating gel.

Figure 14:
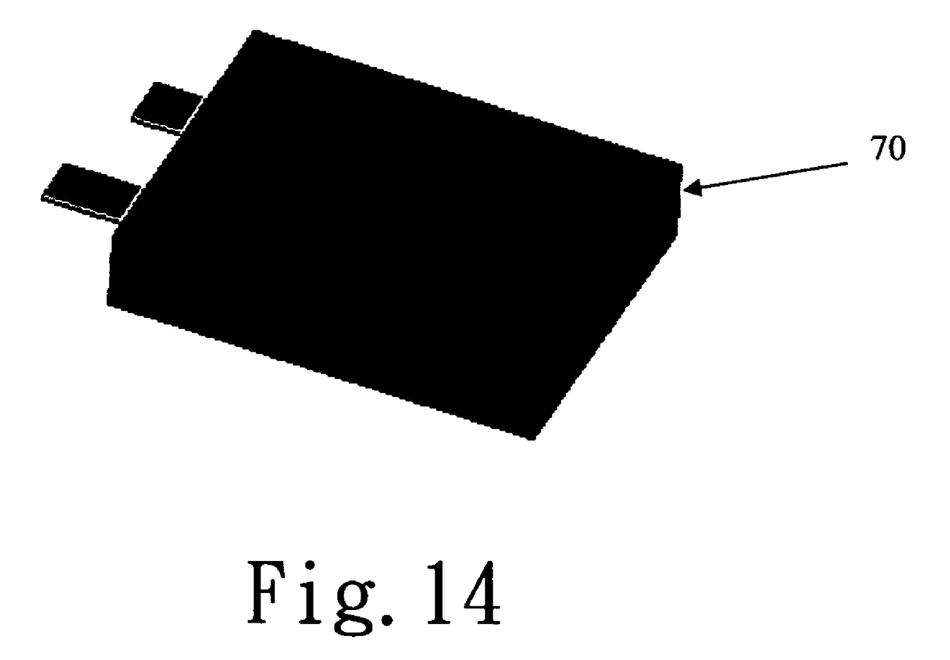
FIG. 14 illustrates the pre-structuring unit of an ultracapacitor in the invention.

The pre-structuring unit of storing energy 60, as shown in FIG. 14, is encapsulated with protective resin (for example, epoxy resin), and then the storing energy device 70 is accomplished.

What is claimed is:

1. A method for making a device of storing energy, enhancing the efficiency of manufacture and the reliability of products at least includes:
   (A) Production of the pre-structuring units of storing energy;
   (B) Filling of the electrolyte: through the fillport, the pre-structuring units of storing energy were filled by electrolyte;
   (C) Sealing of the fillports of the pre-structuring units: the fillports were sealed by the gel, and gel pour in the insulating resin;
   the method at least including the following steps of:
   (1) the circumferential disposal of electrode plates: to scrape the circumference of the both faces of the electrode plates to form the electrodes with arc angles;
   (2) coating of the first gel wall: surrounding the porous electrodes, to coat the looped gel wall with an arc angle;
   (3) coating of the second gel wall: to coat with the gel on the support material adjacent to periphery of the first gel wall to form the second gel wall that is higher than the first one;
   (4) cutting of the electrodes: to cut the electrode plates according to the size needed and to make a hole on the pre-prepared support material without pores;
   (5) assembling the pre-structuring units: according to the pre-prepared pore of the electrode plate, to place the separator in between the electrode plates to assemble the pre-structuring units;
   (6) coating of the third gel wall: under pressure, to coat the side of the pre-structuring unit to form the third gel wall; and
   (7) melting of the gel walls: to heat the first, second and third gel walls to melt to completely seal the pre-structuring units of storing energy except the pre-prepared pores, and then, to release the pressure to accomplish the production of the pre-structuring units of storing energy.

2. A method for making a device of storing energy, enhancing the efficiency of manufacture and the reliability of products, according to claim 1, wherein the steps of the circumferential disposal of electrode plate: the electrode plate fully coated with electrodes is scraped to form a electrode with one or a few arc angles by grinder.

3. A method for making a device of storing energy, enhancing the efficiency of manufacture and the reliability of products according to claim 2, wherein the steps of the circumferential disposal of the electrode plate: the electrodes with one or more arc angles can be made by selective coating on the support material and the methods of selective coating include dip coating, spray coating, roll coating, spin coating doctor blading, screen coating and sputtering.

4. A method for making a device of storing energy, enhancing the efficiency of manufacture and the reliability of products according to claim 1, wherein the steps of coating the first gel wall: the first gel wall with arc angles is formed by using a dispensing machine.

5. A method for making a device of storing energy, enhancing the efficiency of manufacture and the reliability of products according to claim 1, wherein the steps of coating the first gel wall: the first gel wall with arc angles is formed by using a screen printer.

6. A method for making a device of storing energy, enhancing the efficiency of manufacture and the reliability of products according to claim 1, wherein the steps of coating the first plastic wall: the first gel wall with arc angles is formed by using a pad printer to pad print surrounding the electrodes.

7. A method for making a device of storing energy, enhancing the efficiency of manufacture and the reliability of products according to claim 1, wherein the steps of coating the first gel wall: the first gel wall with arc angles is formed by using a brush to brush the gel.

8. A method for making a device of storing energy, enhancing the efficiency of manufacture and the reliability of products according to claim 1, wherein the steps of coating the first gel wall: the gel of the first gel wall is composed of materials of the acid (base) resistant TPR (thermal plastic resin) and is mixed to form the low-viscosity organic-solution that is able to penetrate the multipore electrodes.

9. A method for making a device of storing energy, enhancing the efficiency of manufacture and the reliability of products according to claim 1, wherein the steps of coating the second gel wall: the second gel wall with arc angles is formed by using a dispenser to dispense the gel adjacent to the first gel wall.

10. A method for making a device of storing energy, enhancing the efficiency of manufacture and the reliability of products according to claim 1, wherein the steps of coating the second gel wall: the second gel wall with arc angles is formed by attaching a gasket to the periphery of the first gel wall.

11. A method for making a device of storing energy, enhancing the efficiency of manufacture and the reliability of products according to claim 1, wherein the steps of coating the second gel wall: the second gel wall is formed adjacent to the first gel wall by screen printing, spraying, pad printing or brushing.

12. A method for making a device of storing energy, enhancing the efficiency of manufacture and the reliability of products according to claim 1, wherein the steps of coating the second gel wall: the gel of the second gel wall is composed of the materials of the acid(base) resistant TPR (thermal plastic resin).

13. A method for making a device of storing energy, enhancing the efficiency of manufacture and the reliability of products according to claim 1, wherein the steps of cutting the electrode: the electrode plate is cut by the method of wire cutting, press cutting or laser cutting and a pre-prepared pore is made on the electrode.

14. A method for making a device of storing energy, enhancing the efficiency of manufacture and the reliability of products according to claim 1, wherein the steps of accumulating the pre-structuring units: the separator is placed in between the electrode plates to accumulate the pre-structuring units and the electrode plates are connected with or isolated from each other by the isolating film.

15. A method for making a device of storing energy, enhancing the efficiency of manufacture and the reliability of products according to claim 14, wherein the isolating film is composed of the porous material including glass fibers, paper, cellulose, PB, PP or PTFE.

16. A method for making a device of storing energy, enhancing the efficiency of manufacture and the reliability of products according to claim 14, wherein the separator includes the micro-protrusion made of the insulating resin.

17. A method for making a device of storing energy, enhancing the efficiency of manufacture and the reliability of products according to claim 1, wherein the step of coating the third gel wall: the third gel wall is coated under pressuring the pre-structuring units by the way of brushing the side of the device.

18. A method for making a device of storing energy, enhancing the efficiency of manufacture and the reliability of products according to claim 1, wherein the steps of melting the gel walls: the first, second and third gel walls are heated to melt into a whole by a heat source to increase the adhesion of sealing.

19. A method for making a device of storing energy, enhancing the efficiency of manufacture and the reliability of products according to claim 18, wherein the steps of melting the gel walls: the first, second and third gel walls are heated to melt by ultrasound waves.

20. A method for making a device of storing energy, enhancing the efficiency of manufacture and the reliability of products according to claim 18, wherein the steps of melting the gel walls: the first, second and third gel walls are heated to melt by hot wind.

21. A method for making a device of storing energy, enhancing the efficiency of manufacture and the reliability of products according to claim 18, wherein the steps of melting the gel walls: the first, second and third gel walls are heated to melt by infrared rays.

* * * * *